United States Patent
Yamashita et al.

(10) Patent No.: US 9,206,534 B2
(45) Date of Patent: Dec. 8, 2015

(54) METHOD OF PRODUCING OPENED FIBER BUNDLE, METHOD OF PRODUCING CLEANING MEMBER, APPARATUS WHICH OPENS FIBER BUNDLE, AND SYSTEM WHICH PRODUCES CLEANING MEMBER

(71) Applicant: UNICHARM CORPORATION, Ehime (JP)

(72) Inventors: Yuji Yamashita, Kanonji (JP); Yasuhiro Koyama, Kanonji (JP)

(73) Assignee: UNICHARM CORPORATION, Ehime (JP)

(*) Notice: Subject to any disclaimer, the term of this patent is extended or adjusted under 35 U.S.C. 154(b) by 0 days.

(21) Appl. No.: 13/749,716

(22) Filed: Jan. 25, 2013

(65) Prior Publication Data

US 2014/0182779 A1   Jul. 3, 2014

(30) Foreign Application Priority Data

Dec. 29, 2012   (JP) .................... 2012-289174

(51) Int. Cl.
*B29C 67/24* (2006.01)
*D02J 1/18* (2006.01)
(Continued)

(52) U.S. Cl.
CPC . *D02J 1/18* (2013.01); *B32B 5/022* (2013.01); *B32B 5/26* (2013.01); *B32B 7/12* (2013.01);
(Continued)

(58) Field of Classification Search
CPC .......... B32B 27/02; B32B 5/022; B32B 5/26; B32B 7/12; B32B 2250/20; B32B 2262/0261; B32B 2262/0276; B32B 2262/04; B32B 2262/12; B32B 2262/0253; B29C 70/202; D02J 1/18; Y10T 156/1084; Y10T 156/12

USPC .............................. 156/269, 178; 28/282, 283
See application file for complete search history.

(56) References Cited

U.S. PATENT DOCUMENTS 2,738,973 A   3/1956   Koch
2,926,392 A   3/1960   Jackson
(Continued)

FOREIGN PATENT DOCUMENTS

JP   61-105364 U   7/1986
JP   9-111644 A    4/1997
(Continued)

OTHER PUBLICATIONS

Manade Sadanao, Equipment for opening two, method for opening the tow and absorbent article, Oct. 5, 2006, Japan patent office.*

(Continued)

*Primary Examiner* — Michael N Orlando
*Assistant Examiner* — Vishal I Patel
(74) *Attorney, Agent, or Firm* — Hauptman Ham, LLP

(57) ABSTRACT

A method of continuously producing an opened fiber bundle for a cleaning member while conveying a fiber bundle, includes the steps of applying a tensile force to the fiber bundle; relaxing the tensioned fiber bundle to open the fiber bundle; and blowing air in a direction intersecting with the machine direction of the belt-shaped fiber bundle through an air outlet of an air feeder, to further open the belt-shaped fiber bundle and widen the belt-shaped fiber bundle in the width direction. An outer portion in the width direction of the air outlet is disposed downstream in the machine direction, compared with an inner portion in the width direction of the air outlet.

13 Claims, 10 Drawing Sheets

(51) Int. Cl.
*B32B 5/02* (2006.01)
*B32B 5/26* (2006.01)
*B32B 7/12* (2006.01)

(52) U.S. Cl.
CPC ..... *B32B 2250/20* (2013.01); *B32B 2262/0253* (2013.01); *B32B 2262/0261* (2013.01); *B32B 2262/0276* (2013.01); *B32B 2262/04* (2013.01); *B32B 2262/12* (2013.01); *Y10T 156/1084* (2013.01); *Y10T 156/12* (2013.01)

(56) References Cited

U.S. PATENT DOCUMENTS

| | | | |
|---|---|---|---|
| 3,095,343 | A | 6/1963 | Berger |
| 3,226,773 | A * | 1/1966 | Paliyenko ................ 28/283 |
| 3,362,707 | A | 1/1968 | Lauren |
| 3,376,609 | A | 4/1968 | Kalwaites |
| 3,566,451 | A * | 3/1971 | Weigand ................ 28/283 |
| 3,592,371 | A | 7/1971 | Wyatt et al. |
| 3,608,024 | A | 9/1971 | Yazawa et al. |
| 3,737,950 | A | 6/1973 | Bolliand et al. |
| 3,827,113 | A | 8/1974 | Vidal et al. |
| 3,840,941 | A | 10/1974 | Neveu |
| 3,860,127 | A | 1/1975 | Fassman |
| 4,664,368 | A | 5/1987 | Bouwens et al. |
| 5,060,351 | A * | 10/1991 | Street ................ 28/283 |
| 5,060,929 | A | 10/1991 | Kohlmann |
| 5,168,786 | A | 12/1992 | Huggins et al. |
| 5,241,731 | A | 9/1993 | Stuart |
| 5,355,567 | A * | 10/1994 | Holliday ................ 28/282 |
| 6,491,492 | B1 | 12/2002 | Cook |
| 6,585,842 | B1 | 7/2003 | Bompard et al. |
| 6,743,392 | B2 | 6/2004 | Tanaka et al. |
| 7,300,053 | B2 | 11/2007 | Asano |
| 7,536,761 | B2 | 5/2009 | Nestler et al. |
| 7,571,524 | B2 * | 8/2009 | Kawabe et al. ................ 28/283 |
| 2003/0172506 | A1 | 9/2003 | Guirman et al. |
| 2005/0066496 | A1 | 3/2005 | Ames et al. |
| 2005/0198760 | A1 * | 9/2005 | Tanaka et al. ................ 15/226 |
| 2007/0101564 | A1 | 5/2007 | Nestler et al. |
| 2008/0047087 | A1 | 2/2008 | Levy et al. |
| 2010/0015383 | A1 | 1/2010 | Yamada |
| 2012/0102678 | A1 | 5/2012 | Junker et al. |
| 2012/0135227 | A1 | 5/2012 | Kawabe |

FOREIGN PATENT DOCUMENTS

| | | |
|---|---|---|
| JP | 2000-296083 A | 10/2000 |
| JP | 2002-069781 A | 3/2002 |
| JP | 2003-265390 A | 9/2003 |
| JP | 2003-268663 A | 9/2003 |
| JP | 2003-293236 A | 10/2003 |
| JP | 2004-223692 A | 8/2004 |
| JP | 2004-238615 A | 8/2004 |
| JP | 2005-046645 A | 2/2005 |
| JP | 2005-095665 A | 4/2005 |
| JP | 2005-111284 A | 4/2005 |
| JP | 2005-137929 A | 6/2005 |
| JP | 2005-137930 A | 6/2005 |
| JP | 2005-137931 A | 6/2005 |
| JP | 2005-144198 A | 6/2005 |
| JP | 2005-169148 A | 6/2005 |
| JP | 2005-199077 A | 7/2005 |
| JP | 2005-230573 A | 9/2005 |
| JP | 2005-237975 A | 9/2005 |
| JP | 2006-015164 A | 1/2006 |
| JP | 2006-034990 A | 2/2006 |
| JP | 2006-141483 A | 6/2006 |
| JP | 2006-265762 A | 10/2006 |
| JP | 2007-029135 A | 2/2007 |
| JP | 2007-029136 A | 2/2007 |
| JP | 2007-111297 A | 5/2007 |
| JP | 2007-126810 A | 5/2007 |
| JP | 2007-135666 A | 6/2007 |
| JP | 2007-135774 A | 6/2007 |
| JP | 2007-136156 A | 6/2007 |
| JP | 2007-159612 A | 6/2007 |
| JP | 2007-209460 A | 8/2007 |
| JP | 2007-209461 A | 8/2007 |
| JP | 2007-236690 A | 9/2007 |
| JP | 2008-006260 A | 1/2008 |
| JP | 2008-119171 A | 5/2008 |
| JP | 2008-125603 A | 6/2008 |
| WO | 2008/099733 A1 | 8/2008 |

OTHER PUBLICATIONS

International Search Report Mailed Mar. 25, 2014, corresponds to International Application No. PCT/JP2013/085172.

International Search Report Mailed Mar. 18, 2014, corresponds to International Application No. PCT/JP2013/085177.

International Search Report Mailed Apr. 1, 2014, corresponds to International Application No. PCT/JP2013/085233.

Office Action mailed Apr. 29, 2015, corresponding to U.S. Appl. No. 13/749,717.

Office Action mailed Apr. 27, 2015, corresponding to U.S. Appl. No. 13/749,726.

* cited by examiner

FIG.5
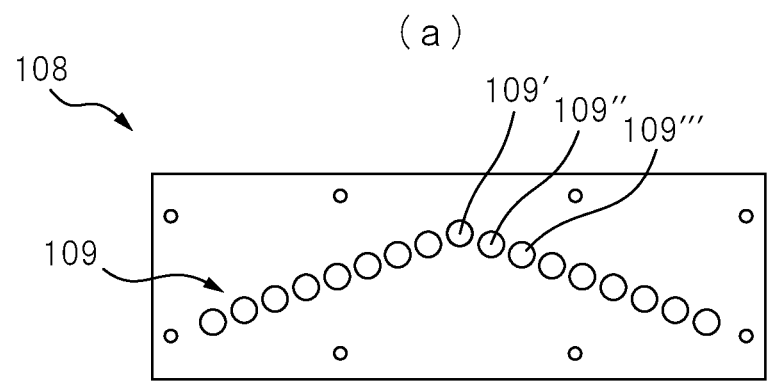
(a)
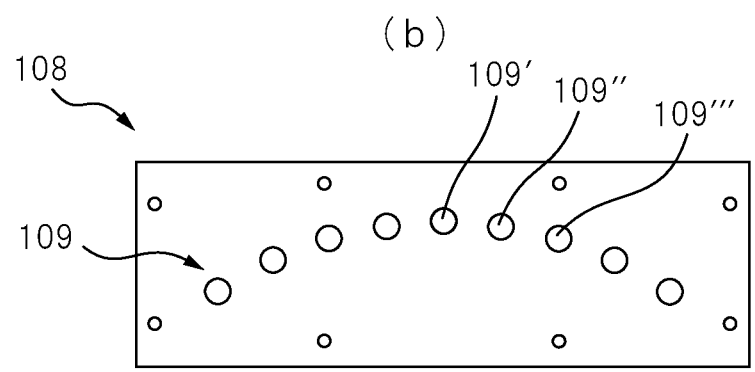
(b)
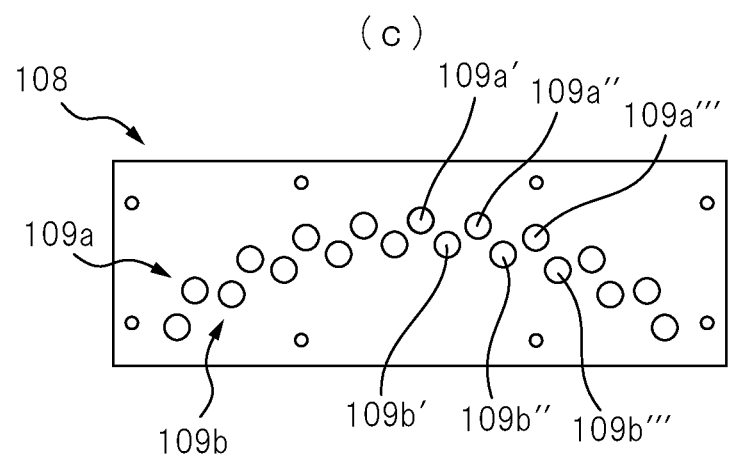
(c)

FIG.6
(a)
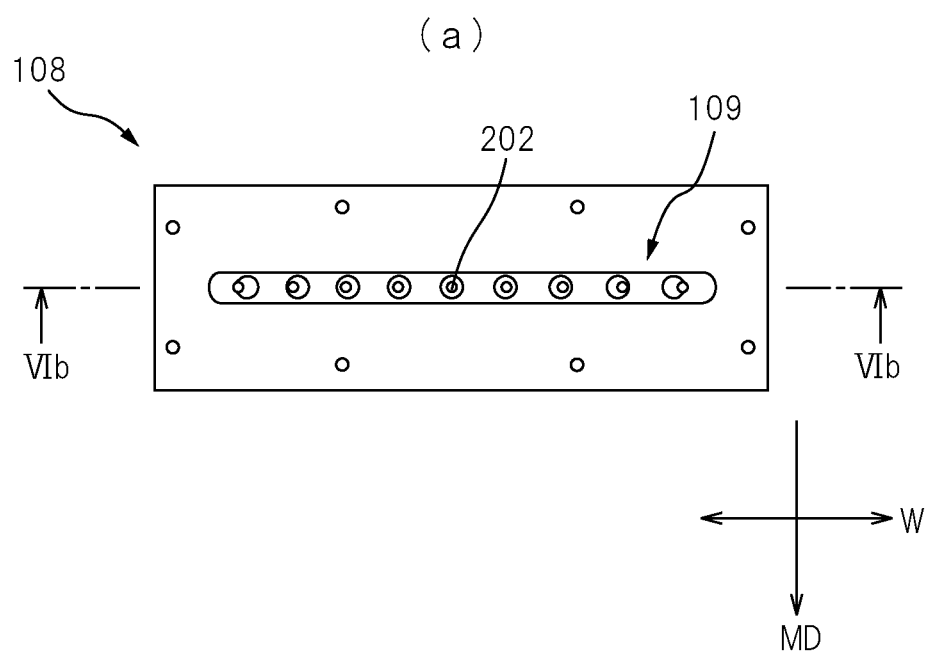
(b)
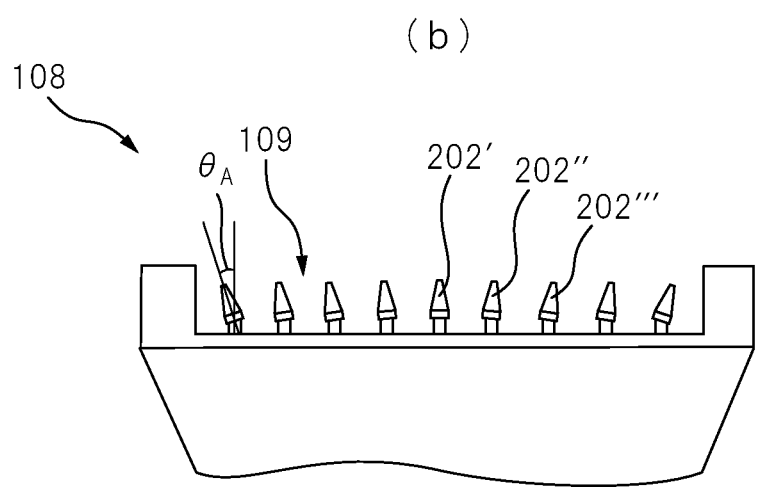

FIG.8
(a)
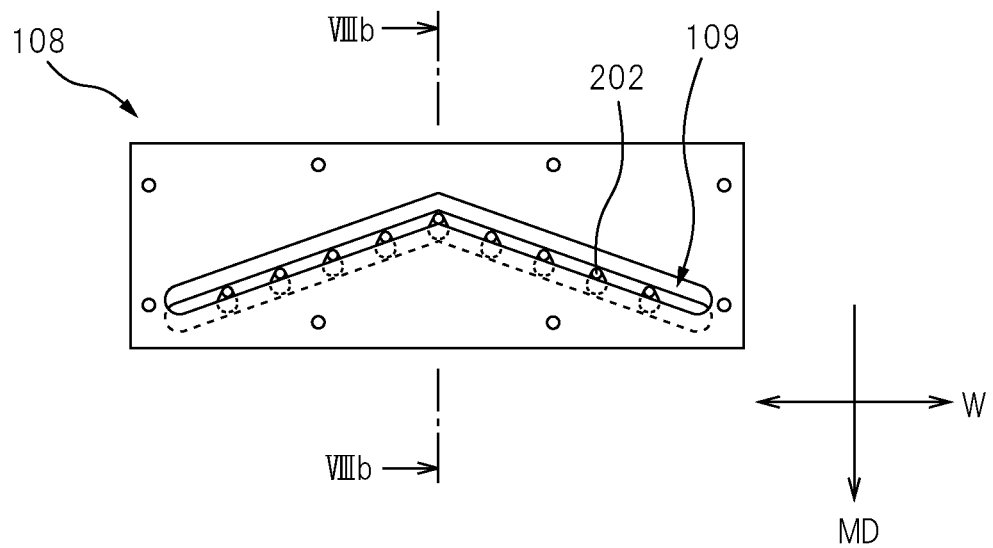
(b)
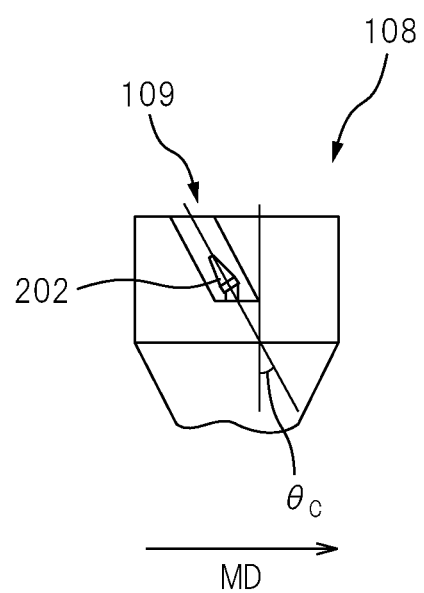

F I G. 11
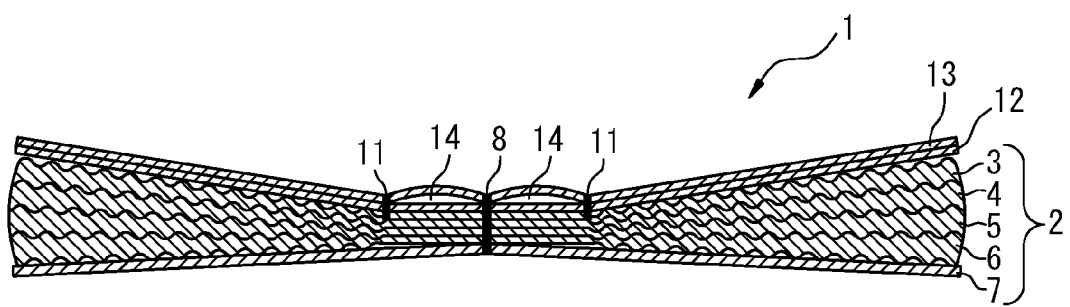
F I G. 12
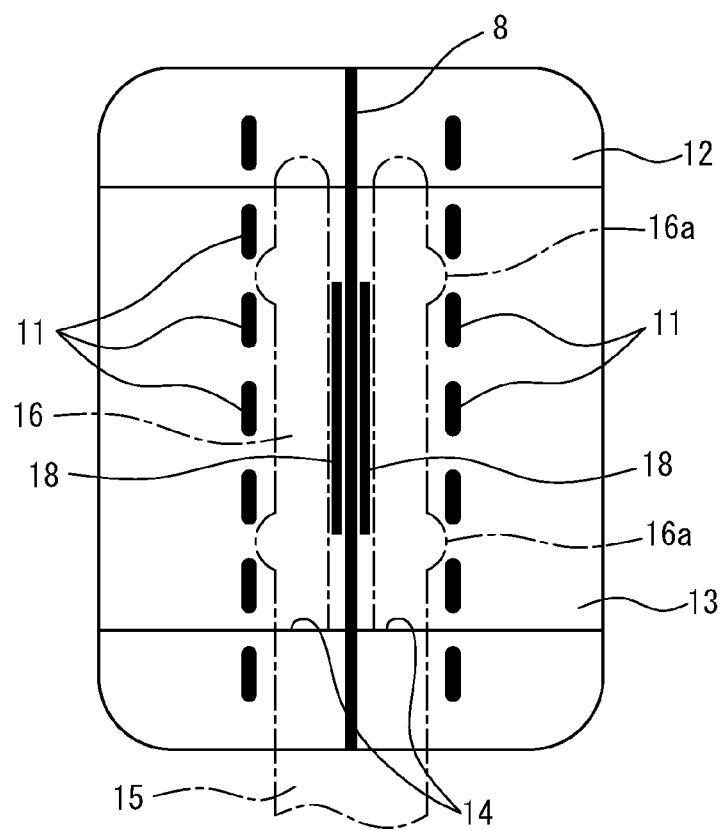

METHOD OF PRODUCING OPENED FIBER BUNDLE, METHOD OF PRODUCING CLEANING MEMBER, APPARATUS WHICH OPENS FIBER BUNDLE, AND SYSTEM WHICH PRODUCES CLEANING MEMBER

RELATED APPLICATIONS

The present application is based on, and claims priority from, Japanese Application Number 2012-289174, filed Dec. 29, 2012, the disclosure of which is hereby incorporated by reference herein in its entirety.

TECHNICAL FIELD

The present disclosure relates to a method of producing an opened fiber bundle, a method of producing a cleaning member, an apparatus which opens a fiber bundle, and a system which produces a cleaning member.

BACKGROUND ART

Various methods for opening a fiber bundle, particularly a bundle of crimped fibers for use in a brush part or the like of a cleaning member have been being considered.

For example, PTL 1 describes a method for opening continuous filaments, the method including transporting crimped tow by means of a plurality of rolls; and applying a resistance on at least one side of the tow by slidingly contacting at least one sliding body onto the tow at between rolls, whereby continuous filaments stacked in a thickness direction of the tow are caused to sift in a transporting direction of the tow to open the tow and to spread the continuous filaments in a width direction of the tow.

PTL 2 describes an apparatus which opens tow so that the opened tow has an almost flat cross section, the apparatus including a device for widening the tow by blowing air onto the tow passing through a cylindrical chamber, a mechanism for opening the tow by running the tow through upstream nip rolls disposed and then downstream nip rolls to tighten the tow, and a device for thickening the tow by blowing air into the tow passing through a cylindrical chamber. Such apparatus includes a plurality of the widening devices, at least one of which is configured to act on the tow between the upstream nip rolls and the downstream nip rolls.

CITATIONS LIST

Patent Literature

[PTL 1] Japanese Unexamined Patent Publication No. 2002-069781
[PTL 2] Japanese Unexamined Patent Publication No. 2006-265762

SUMMARY OF INVENTION

Technical Problem

The method described in PTL 1 requires a plurality of sliding plates, which results in a larger opening apparatus, and thus it is difficult to miniaturize the apparatus for producing a cleaning member.

The opening apparatus described in PTL 2 is intended to produce tows for a diaper absorbent and focuses on thickening the opened tow.

Thus it is an object of the present disclosure to provide a method of producing a thin and uniform opened belt-shaped fiber bundle.

Solution to Problem

As a result of assiduous research intended to solve the problems described above, the present inventors have found a method of continuously producing an opened fiber bundle while conveying a fiber bundle, comprising the steps of ($a_1$) applying a tensile force to the fiber bundle; ($a_2$) relaxing the tensioned fiber bundle to open the fiber bundle, thereby forming a belt-shaped fiber bundle; and ($a_3$) blowing air in a direction intersecting with the machine direction of the belt-shaped fiber bundle through an air outlet of an air feeder, the unit extending in the width direction, to further open the belt-shaped fiber bundle and widen the belt-shaped fiber bundle in the width direction, wherein an outer portion in the width direction of the air outlet is disposed downstream in the machine direction, compared with an inner portion in the width direction of the air outlet.

Effects of Invention

The method of producing an opened fiber bundle according to the present disclosure provide an effect of producing a thin and uniform opened belt-shaped fiber bundle.

BRIEF DESCRIPTION OF DRAWINGS

FIG. 5 illustrate a method of producing an opened fiber bundle and an apparatus which opens a fiber bundle according to another embodiment of the present disclosure.

FIG. 6 illustrate a method of producing an opened fiber bundle and an apparatus which opens a fiber bundle according to another embodiment of the present disclosure.

FIG. 8 illustrate a method of producing an opened fiber bundle and an apparatus which opens a fiber bundle according to another embodiment of the present disclosure.

FIG. 11 is a cross sectional view taken along the line XI-XI in FIG. 10.

FIG. 12 is a plan view of the cleaning member 1 in FIG. 10.

DESCRIPTION OF EMBODIMENTS

The method of producing an opened fiber bundle, the method of producing a cleaning member, the apparatus which opens a fiber bundle, and the system which produces a cleaning member according to the present disclosure will be described in detail.

<<Method of Producing Opened Fiber Bundle and Apparatus which Opens Fiber Bundle>>

The method of continuously producing an opened fiber bundle for a cleaning member according the present disclosure (hereinafter referred to as "method of producing an opened fiber bundle") includes the steps of:

($a_1$) applying a tensile force to a fiber bundle (hereinafter referred to as "step ($a_1$)");

($a_2$) relaxing the tensioned fiber bundle to open the fiber bundle, thereby forming a belt-shaped fiber bundle (hereinafter referred to as "step ($a_2$)"); and ($a_3$) blowing air in a direction intersecting with the machine direction of the belt-shaped fiber bundle through an air outlet of an air feeder, the unit extending in the width direction, to further open the belt-shaped fiber bundle and widen the belt-shaped fiber bundle in the width direction (hereinafter referred to as "step ($a_3$)").

In the air outlet in the step ($a_3$), an outer portion in the width direction of the air outlet is disposed downstream in the machine direction, compared with an inner portion in the width direction of the air outlet, or an outer portion in the width direction of the air outlet blows air in a direction inclined toward an edge of the width compared with an inner portion in the width direction of the air outlet.

The apparatus which opens a fiber bundle for a cleaning member according to the present disclosure (hereinafter referred to as "apparatus which opens a fiber bundle") includes:

first nip rolls, second nip rolls, which are disposed downstream from the first nip rolls, have a faster peripheral velocity compared with the first nip rolls, and, together with the first nip rolls, convey the fiber bundle to apply a tensile force to the fiber bundle, third nip rolls, which are disposed downstream from the second nip rolls, have a slower peripheral velocity compared with the second nip rolls, and, together with the second nip rolls, convey the fiber bundle to relax the fiber bundle, thereby forming a belt-shaped fiber bundle, and an air feeder which is disposed downstream from the second nip rolls and includes an air outlet extending in the width direction and blowing air in a direction intersecting with the machine direction of the belt-shaped fiber bundle.

The present disclosure will be described along with the method of producing an opened fiber bundle according to the present disclosure and with reference to FIG. 1.

Figure 1:
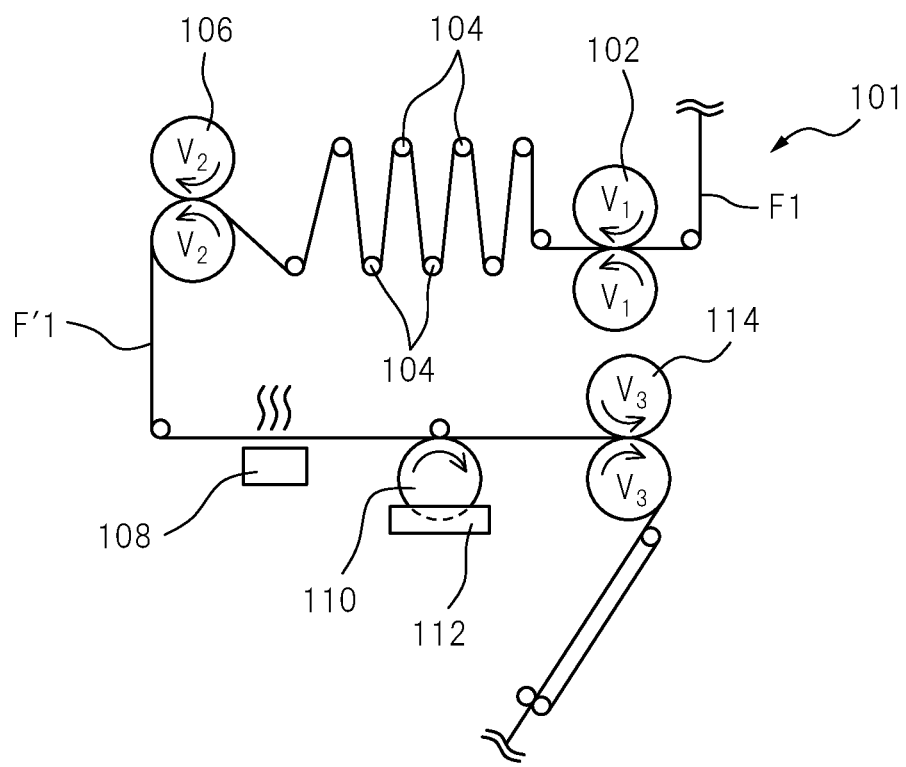
FIG. 1 is a schematic view illustrating a method of producing an opened fiber bundle and an apparatus which opens a fiber bundle according to an embodiment of the present disclosure.

FIG. 1 is a schematic view illustrating a method of producing an opened fiber bundle and an apparatus which opens a fiber bundle according to an embodiment of the present disclosure.

[Step ($a_1$)]

As illustrated in FIG. 1, the step ($a_1$) is performed by first nip rolls 102 and second nip rolls 106, which are disposed downstream from the first nip rolls 102 and have a faster peripheral velocity compared with the first nip rolls 102.

As illustrated in FIG. 1, a first fiber bundle F1 is drawn from a container (not illustrated) and conveyed onto the first nip rolls 102. The first nip rolls 102 rotate at a constant peripheral velocity $V_1$ to convey the first fiber bundle F1 in the machine direction MD. The first fiber bundle F1 runs through the first nip rolls 102 and then runs through tension rolls 104 to reach the second nip rolls 106, which rotates at a constant peripheral velocity $V_2$.

The second nip rolls 106 are configured to have the peripheral velocity $V_2$ faster than the peripheral velocity $V_1$ of the first nip rolls 102. Such configuration allows a tensile force in the machine direction to be applied to the first fiber bundle F1 between the first nip rolls 102 and the second nip rolls 106. As a result, the first fiber bundle F1 is extended.

If the first fiber bundle F1 includes crimped fibers, the crimped fibers before the tensile force is applied are approximately uniformly crimped due to its production process, and thus the crimped fibers are less likely to unravel. Application of a tensile force to such fibers allows the crimps of the fibers to be temporarily extended, thereby reducing the crimp degree.

The plurality of tension rolls 104 are preferably formed of, for example, solid steel so that the rolls have a high mass. As substantial force is required to rotate the tension rolls 104, the rate of movement of the first fiber bundle F1 conveyed from the first nip rolls 102 to the second nip rolls 106 can be gradually increased, and thus the tensile force applied to the first fiber bundle F1 can be gradually increased.

The plurality of tension rolls 104 are disposed so that the distance between the first nip rolls 102 and the second nip rolls 106 is increased, in order to gradually increase the tensile force applied to the first fiber bundle F1.

A method of producing an opened fiber bundle and an apparatus which opens a fiber bundle according to another embodiment of the present disclosure do not use the tension rolls.

[Step ($a_2$)]

As illustrated in FIG. 1, the step ($a_2$) is performed by the second nip rolls 106 and third nip rolls 114, which are disposed downstream from the second nip rolls 106 and have a slower peripheral velocity compared with the second nip rolls 106.

The first fiber bundle F1 runs through the second nip rolls 106 and then reach the third nip rolls 114 via an air feeder 108 and an oil applicator 110. The third nip rolls 114 are configured to have the peripheral velocity $V_3$ slower than the peripheral velocity $V_2$ of the second nip rolls 106. Thus, after the first fiber bundle F1 runs through the second nip rolls 106, the fibers of the first fiber bundle F1 are opened between the second nip rolls 106 and the third nip rolls 114 because the tensile force is relieved, and the first fiber bundle F1 is further widened, thereby forming a first belt-shaped fiber bundle F'1.

The air feeder 108 will be described in "Step ($a_3$)" described below, while the oil applicator 110 will be described in "Other Steps" described below.

In the method of producing an opened fiber bundle and the apparatus which opens a fiber bundle, and the method of producing a cleaning member and the system which produces a cleaning member as described below, "width direction", as used herein, means a direction which is orthogonal to the machine direction and is horizontal, unless otherwise indicated.

When the first fiber bundle F1 includes crimped fibers, relief of the tensile force allows the crimp of the crimped fibers to be recovered, while the crimps of the adjacent fibers are misaligned, thereby opening the fiber bundle.

[Step ($a_3$)]

As illustrated in FIG. 1, the step ($a_3$) is performed by the air feeder 108, which is disposed downstream from the second nip rolls 106 and blows air in a direction intersecting with the machine direction of the belt-shaped fiber bundle F'1.

In an embodiment of the method of producing an opened fiber bundle and the apparatus which opens a fiber bundle according to the present disclosure, the step ($a_3$) is performed after the step ($a_2$) completes. In another embodiment of the method of producing an opened fiber bundle and the apparatus which opens a fiber bundle according to the present disclosure, the step ($a_3$) at least partially overlaps with the step ($a_2$). For example, the step ($a_3$) is performed during the step ($a_2$).

In FIG. 1, the air feeder 108 is disposed between the second nip rolls 106 and the third nip rolls 114, and blows air in a direction intersecting with the machine direction of the first belt-shaped fiber bundle F'1, through its air outlet extending in the width direction.

Figure 2:
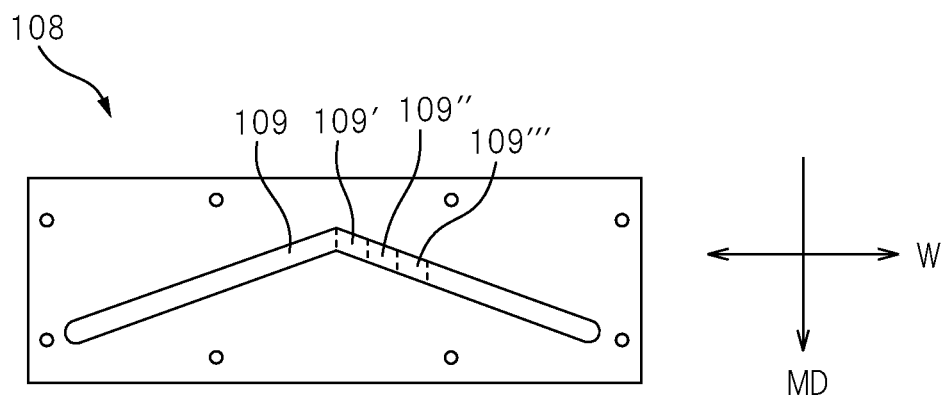
FIG. 2 is a plan view of an air feeder 108 used in a method of producing an opened fiber bundle and an apparatus which opens a fiber bundle according to an embodiment of the present disclosure.

FIG. 2 is a plan view of an air feeder 108 used in a method of producing an opened fiber bundle and an apparatus which opens a fiber bundle according to an embodiment of the present disclosure. The air feeder 108 illustrated in FIG. 2 includes an air outlet 109 extending in the width direction W and is connected to a compressor (not illustrated) which provides compressed air. In the air outlet 109 of the air feeder 108 illustrated in FIG. 2, an outer portion 109''' of the air outlet in the width direction W of the air feeder 108 is disposed downstream in the machine direction MD, compared with an inner portion 109' of the air outlet therein. Similarly, in the air outlet 109, an outer portion 109''' of the air outlet in the width direction W of the air feeder 109 is disposed downstream in the machine direction MD, compared with the inner portion 109'' of the air outlet therein.

The air outlet 109 of the air feeder 108 illustrated in FIG. 2 includes portions of the air outlet (109', 109'', 109''', and the like) which are continuously disposed, and the unit 109 is inverted V-shaped.

Figure 3:
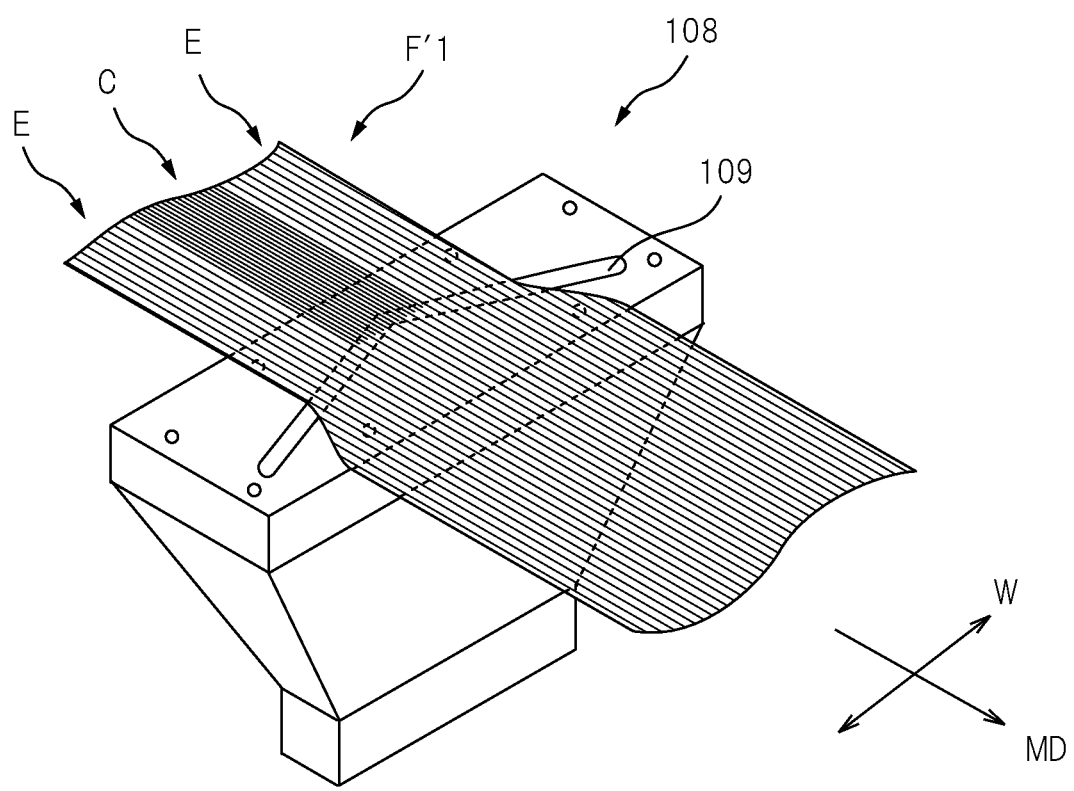
FIG. 3 is a schematic view of the air feeder 108 as illustrated in FIG. 2 which the air feeder is blowing air onto a belt-shaped fiber bundle F'1.

FIG. 3 is a schematic view of the air feeder 108 as illustrated in FIG. 2, which the air feeder is blowing air onto a belt-shaped fiber bundle F'1. The air feeder 108 blows air in a direction intersecting with the machine direction MD of the belt-shaped fiber bundle F'1, specifically in an upward direction, through the air outlet 109 to further open the belt-shaped fiber bundle F'1 and widen the belt-shaped fiber bundle F'1 in the width direction W. Although the amount (basis weight) of the fibers of the belt-shaped fiber bundle F'1 after running through the second nip rolls 102 tends to be larger closer to the center region C of the width, the air feeder 108 allows the fibers of the belt-shaped fiber bundle F'1 in the center region C to be dispersed on the edges E of the width, thereby thinning and uniforming the opened belt-shaped fiber bundle F'1.

The air feeder 108 illustrated in FIG. 3 is blowing air upwardly onto the belt-shaped fiber bundle F'1 through the air outlet 109 disposed under the belt-shaped fiber bundle F'1.

As used herein, "upwardly" means a vertically upward direction, while "under" means a vertically downward direction.

In another embodiment of the method of producing an opened fiber bundle and the apparatus which opens a fiber bundle according to the present disclosure, the air feeder is disposed other than a location under the belt-shaped fiber bundle such as, a location above the belt-shaped fiber bundle.

In another embodiment of the method of producing an opened fiber bundle and the apparatus which opens a fiber bundle according to the present disclosure, air is blown upwardly onto the belt-shaped fiber bundle through the air outlet disposed under the belt-shaped fiber bundle, and a float control plate is disposed so that the belt-shaped fiber bundle is sandwiched between the plate and the air outlet to prevent the belt-shaped fiber bundle from floating.

Figure 4:
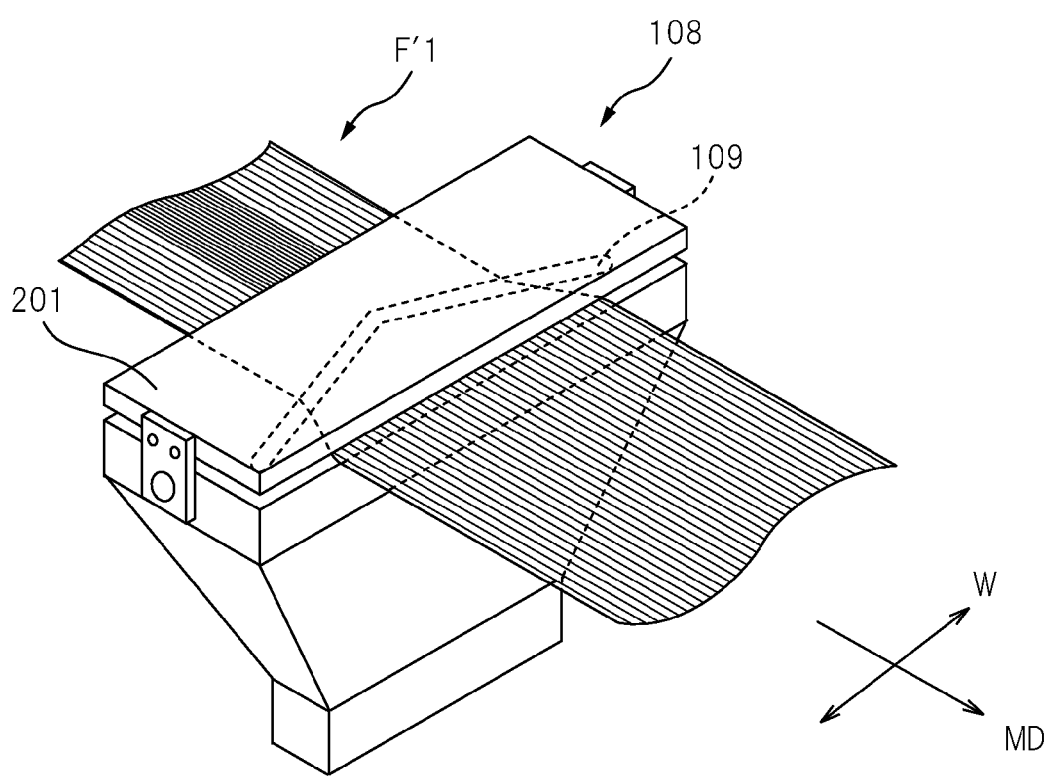
FIG. 4 illustrates a method of producing an opened fiber bundle and an apparatus which opens a fiber bundle according to another embodiment of the present disclosure.

FIG. 4 illustrates a method of producing an opened fiber bundle and an apparatus which opens a fiber bundle according to another embodiment of the present disclosure. As in FIG. 3, the air feeder 108 illustrated in FIG. 4 is blowing air upwardly onto the belt-shaped fiber bundle F'1 through the air outlet 109 disposed under the belt-shaped fiber bundle F'1. The air feeder 108 illustrated in FIG. 4 includes a float control plate 201 disposed above the air outlet 109 so that the belt-shaped fiber bundle F'1 is sandwiched between the plate and the air outlet 109 to prevent the belt-shaped fiber bundle F'1 from floating. The float control plate makes the belt-shaped fiber bundle less likely to move upward, and thus the belt-shaped fiber bundle can be more readily opened and widened in the width direction W.

FIG. 5 are a plan view illustrating a method of producing an opened fiber bundle and an apparatus which opens a fiber bundle according to another embodiment of the present disclosure, and illustrating an example of variations of the air outlet 109 of the air feeder 108 illustrated in FIG. 2.

The air feeder 108 illustrated in FIG. 5 (a) includes an air outlet 109 extending in the width direction, and has the same configuration as the air feeder illustrated in FIG. 2 except that the air outlet 109 includes portions of the air outlet (109', 109'', 109''', and the like) which are disposed intermittently.

The air feeder 108 illustrated in FIG. 5 (b) includes an air outlet 109 extending in the width direction, and has the same configuration as the air feeder illustrated in FIG. 2 except that the air outlet 109 includes portions of the air outlet (109', 109'', 109''', and the like) which are disposed intermittently and the air outlet 109 is curve-shaped.

The air feeder 108 illustrated in FIG. 5 (c) includes an air outlet 109 extending in the width direction, and has the same configuration as the air feeder illustrated in FIG. 2 except that the air outlet 109 includes portions of the air outlet 109a and 109b, the portions of the air outlet 109a (109a', 109a'', 109a''', and the like) being disposed intermittently and forming a curved shape and the portions of the air outlet 109b (109b', 109b'', 109b''', and the like) being disposed intermittently and forming a curved shape.

FIG. 6 illustrates a method of producing an opened fiber bundle and an apparatus which opens a fiber bundle according to another embodiment of the present disclosure. FIG. 6 (a) is a plan view, and FIG. 6 (b) is a cross sectional view taken along the line VIb-VIb in FIG. 6 (a). The air feeder 108 illustrated in FIG. 6 includes an air outlet 109 extending in width direction W, the air outlet 109 including a plurality of air nozzles 202 spaced at predetermined intervals in the width direction W.

In the air outlet 109 of the air feeder 108 illustrated in FIG. 6, an air nozzle 202'' which is an outer portion of the air outlet in the width direction W, blows air in a direction further inclined toward an edge of the width compared with an air nozzle 202' which is an inner portion thereof in the width direction W. The inclination is an angle which is represented as $\theta_A$ in FIG. 6 and means an angle formed by the vertical direction and the direction of blowing air through the nozzle. In the air outlet 109 of the air feeder 108 illustrated in FIG. 6, an air nozzle 202''' which is an outer portion in the width direction W of the air outlet, blows air in a direction further inclined toward an edge of the width compared with the air nozzle 202'' which is an inner portion thereof in the width direction W.

As illustrated in FIG. 6, because the outer portions in the width direction W of the air outlet blow air in a direction further inclined toward an edge of the width compared to the inner portions of the air outlet in the width direction of the air outlet, the belt-shaped fiber bundle can be further opened and widened in the width direction.

Figure 7:
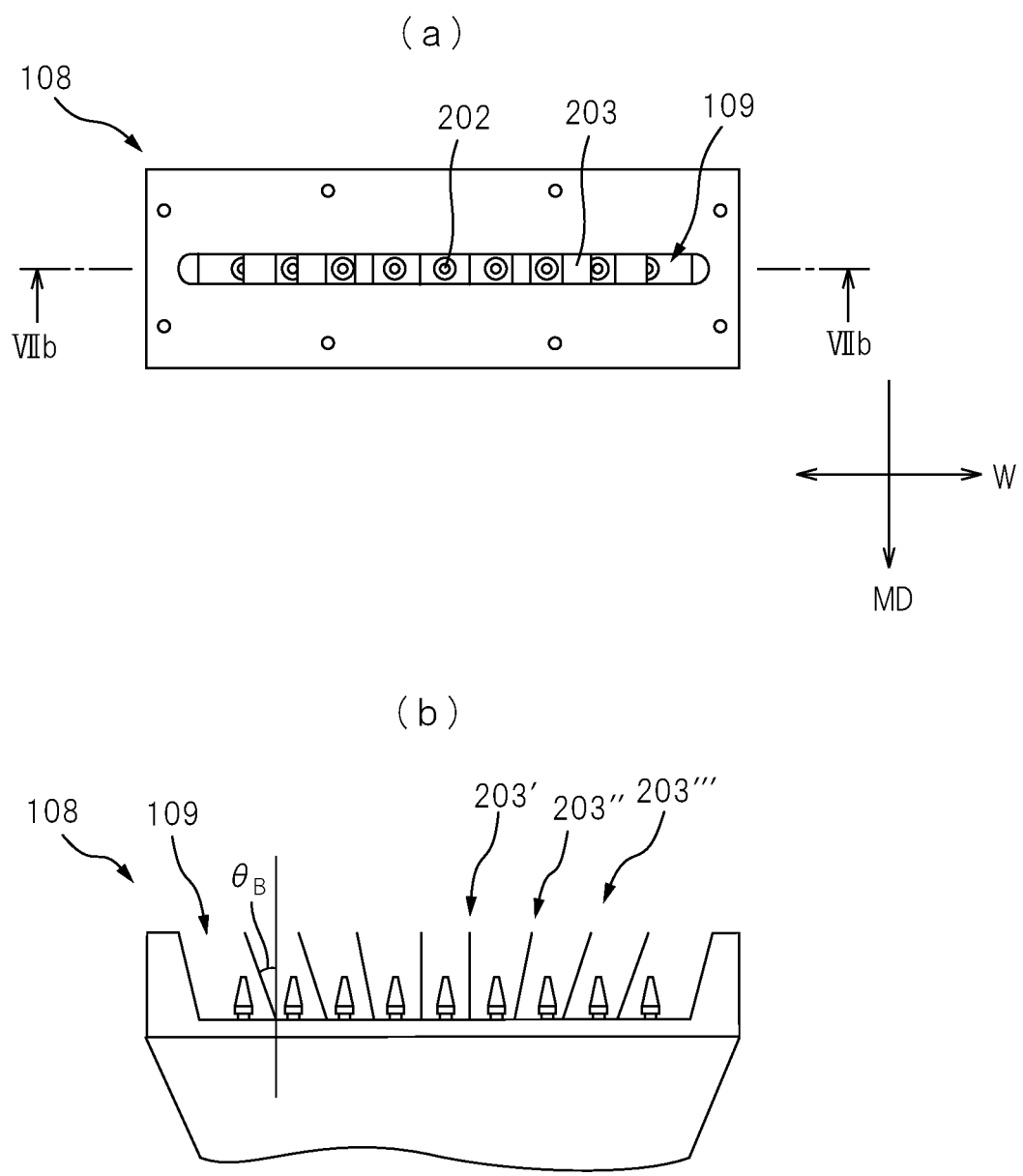
FIG. 7 illustrate a method of producing an opened fiber bundle and an apparatus which opens a fiber bundle according to another embodiment of the present disclosure.

FIG. 7 illustrate a method of producing an opened fiber bundle and an apparatus which opens a fiber bundle according to another embodiment of the present disclosure. FIG. 7 (a) is a plan view, and FIG. 7 (b) is a cross sectional view taken along the line VIIb-VIIb in FIG. 7 (a). The air feeder 108 illustrated in FIG. 7 includes an air outlet 109 extending in the width direction W, the air outlet 109 including a plurality of air nozzles 202 and a plurality of baffles 203. The plurality of air nozzles 202 are spaced at predetermined intervals in the width direction W and blow air upwardly.

In the air outlet 109 of the air feeder 108 illustrated in FIG. 7, an baffle 203" which is an outer portion in the width direction W of the air outlet, blows air in a direction further inclined toward an edge of the width compared with an baffle 203' which is an inner portion in the width direction W of the air outlet. The inclination is an angle which is represented as $\theta_B$ in FIG. 7 and means an angle formed by the vertical direction and the baffle. In the air outlet 109 of the air feeder 108 illustrated in FIG. 7, an baffle 203''' which defines an outer portion in the width direction W of the air outlet changes the direction of the air to further inclined direction toward an edge of the width compared with the baffle 203" which defines an inner portion in the width direction W of the air outlet.

FIG. 8 illustrate a method of producing an opened fiber bundle and an apparatus which opens a fiber bundle according to another embodiment of the present disclosure. FIG. 8 (a) is a plan view, and FIG. 8 (b) is a cross sectional view taken along the line VIIIb-VIIIb in FIG. 8 (a). The air feeder 108 illustrated in FIG. 8 includes an air outlet 109 extending in the width direction W and the air outlet 109 is inverted V-shaped as in FIG. 2. The air feeder 108 illustrated in FIG. 8 includes a plurality of air nozzles 202 disposed in the air outlet 109 at predetermined intervals.

The air feeder 108 illustrated in FIG. 8 blows air in a direction inclined upstream in the machine direction, instead of a direction inclined toward an edge of the width, through the plurality of air nozzles 202.

As illustrated in FIG. 8, because air is blown in a direction inclined upstream in the machine direction, the belt-shaped fiber bundle can be further opened and widened compared with the embodiment illustrated in FIG. 2.

In still another embodiment of the method of producing an opened fiber bundle and the apparatus which opens a fiber bundle according to the present disclosure, in the air outlet, an outer portion in the width direction of the air outlet, blows air in a direction further inclined toward an edge of the width compared with an inner portion in the width direction of the air outlet, and the air outlet blows air in a direction inclined upstream in the machine direction.

In another embodiment of the method of producing an opened fiber bundle and the apparatus which opens a fiber bundle according to the present disclosure, an air feeder is disposed downstream from the third nip rolls.

[Other Steps]

An embodiment of the method of producing an opened fiber bundle according to the present disclosure further includes a step of applying dust adsorbent oil to a fiber bundle. The step may be performed after the step ($a_2$) completes or may at least partially overlap with the step ($a_2$).

An embodiment of the apparatus which opens a fiber bundle according to the present disclosure includes an oil applicator.

In FIG. 1, the oil applicator 110 and a dust adsorbent oil bath 112 are disposed between the second nip rolls 106 and the third nip rolls 114. Dust adsorbent oil is transferred from the dust adsorbent oil bath 112 to the oil applicator 110, i.e., oil transfer roll, and then the dust adsorbent oil is transferred from the oil transfer roll to the first belt-shaped fiber bundle F'1. The dust adsorbent oil acts to enhance adsorption of dust, dirt, and the like and includes, for example, liquid paraffin and surfactant as major components.

In another embodiment of the method of producing an opened fiber bundle and the apparatus which opens a fiber bundle according to the present disclosure, the oil applicator is disposed at a location other than between the second nip rolls and the third nip rolls such as, a location upstream from the second nip rolls or a location downstream from the third nip rolls.

<<Method of Producing Cleaning Member and System which Produces Cleaning Member>>

The method of producing a cleaning member according to the present disclosure includes the steps of:

(A) continuously producing an opened fiber bundle (hereinafter referred to as "step (A)"), (B) stacking the opened fiber bundle with one or more other materials to form a multilayer web and fixing the respective materials of the multilayer web to each other (hereinafter referred to as "step (B)"), and (C) cutting the fixed multilayer web into individual cleaning members (hereinafter referred to as "step (C)).

The system which produces a cleaning member according to the present disclosure includes:

an apparatus which opens a fiber bundle, one or more apparatuses which stack the opened fiber bundle with one or more other materials to form a multilayer web and fix the respective materials of the multilayer web to each other, and one or more apparatuses which cut the fixed multilayer web into individual cleaning members.

By way of example, the cleaning member illustrated in FIGS. 10 to 12 will be described and then the present disclosure will be described along with the method of producing a cleaning member and with reference to FIG. 9.

[Illustration of Cleaning Member]

Figure 9:
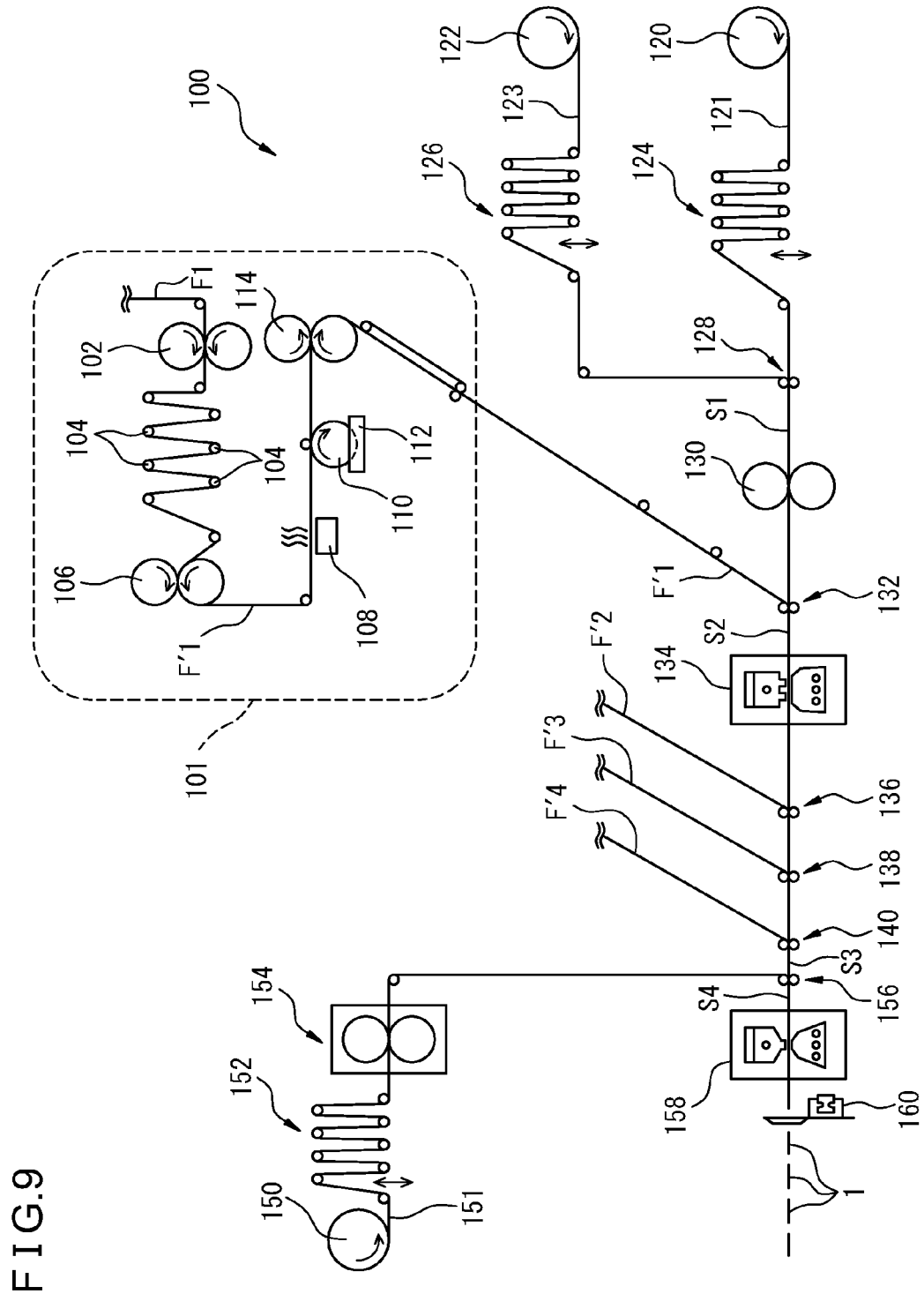
FIG. 9 is a schematic view illustrating an apparatus which opens a fiber bundle according to an embodiment of the present disclosure and a system which produces a cleaning member according to an embodiment of the present disclosure.

FIG. 9 is a schematic view illustrating an apparatus which opens a fiber bundle and a system which produces a cleaning member according to an embodiment of the present disclosure.

Figure 10:
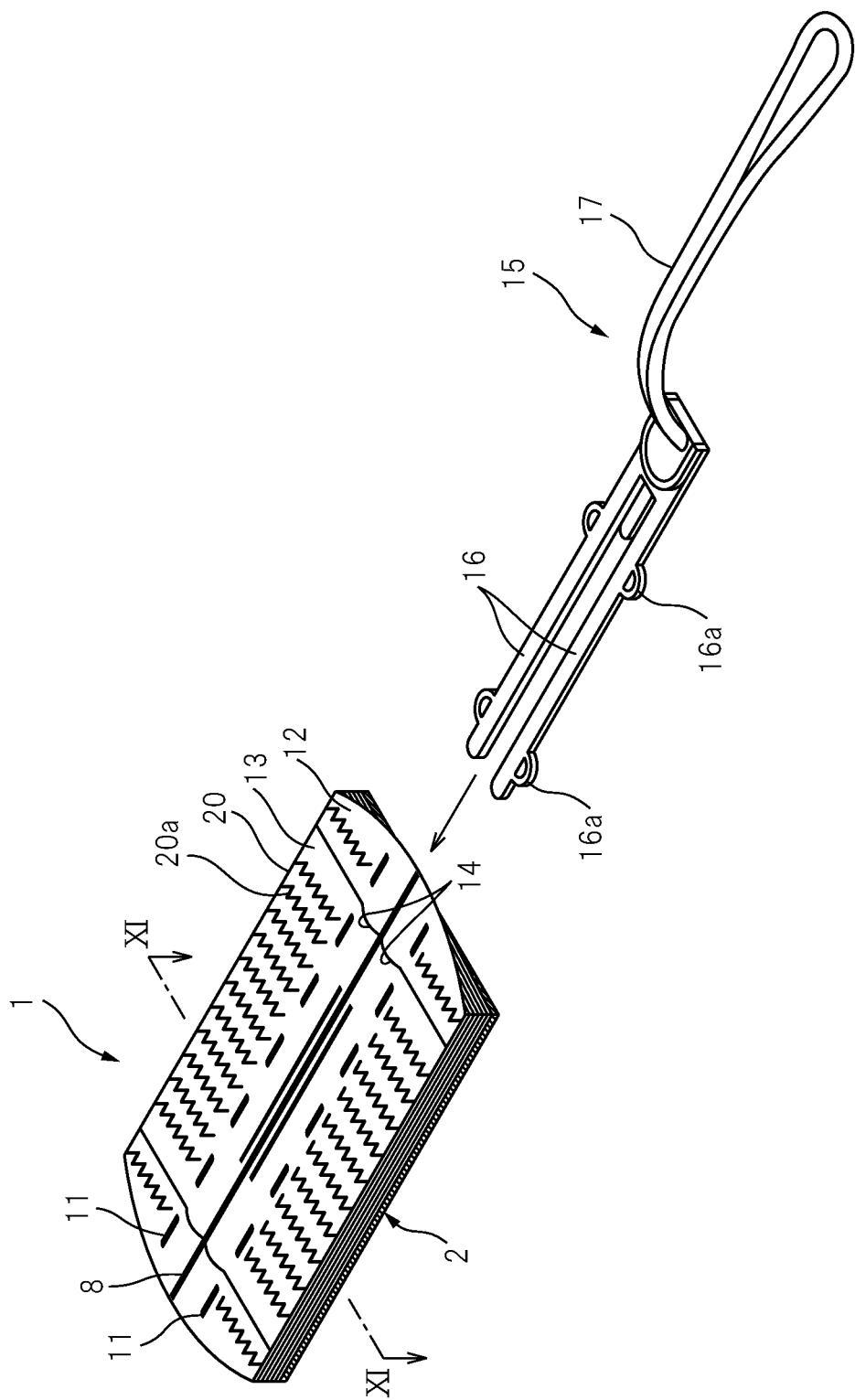
FIG. 10 is an overall perspective view of a cleaning member 1 and a handle 15.

FIG. 10 to FIG. 12 illustrate a cleaning member 1 produced using the system which produces a cleaning member 100 illustrated in FIG. 9.

FIG. 10 is an overall perspective view of a cleaning member 1 and a handle 15, and FIG. 11 is a cross sectional view taken along the line XI-XI in FIG. 10. And FIG. 12 is a plan view of the cleaning member 1 in FIG. 10.

The cleaning member 1 illustrated in FIG. 10 to FIG. 12 includes a brush part 2 including a first fibrous member 3, a second fibrous member 4, a third fibrous member 5, a fourth fibrous member 6, and a sheet with slits 7 disposed under the fourth fibrous member 6; a substrate sheet 12 stacked on the brush part 2; and a holding sheet 13 stacked on the substrate sheet 12. And a receiving part 14 is disposed between the substrate sheet 12 and the holding sheet 13, into which an insert part 16 of the handle 15 is inserted.

The upper portion in FIG. 11 is held by the handle, while the lower portion is used for cleaning.

The cleaning member 1 illustrated in FIGS. 10 to 12 includes two receiving parts 14 into which the two-branched insert part 16 of the handle 15 can be inserted. The insert part of the handle, however, may include three or more branches or include no branches. The number of the receiving parts of the cleaning member varies depending on the number of the branches of the insert part of the handle.

As illustrated in FIG. 10, the brush part 2 includes a four-layered fibrous unit which includes the first fibrous member 3, the second fibrous member 4 disposed under the first fibrous member 3, the third fibrous member 5 disposed under the second fibrous member 4, and the fourth fibrous member 6 disposed under the third fibrous member 5; and the sheet with slits 7, which is disposed under the fourth fibrous member 6 of the four-layered fibrous unit. The fibrous unit of the brush part 2 is not limited to the four-layered structure and may include one, two, three, or five or more layers. In another embodiment, the brush part 2 does not include the sheet with slits 7.

Dust adsorbent oil which enhances adsorption of dust, dirt, and the like and which includes, for example, liquid paraffin as a major component is applied to the first, second, third, and fourth fibrous members 3, 4, 5, and 6 of the brush part 2.

The first, second, third, and fourth fibrous member 3, 4, 5, and 6 of the brush part 2 may be formed by cutting an opened fiber bundle such as, an opened tow.

As used herein, "tow" means a bundle of a multiplicity of filaments, as described in JIS L 0204-3: 1998, 3.1.24.

The fiber bundle as described above includes, for example, a fiber bundle which consists of thermoplastic fibers and a fiber bundle which includes thermoplastic fibers.

The fiber materials which constitute the fiber bundle as described above include, for example, polyethylene, polypropylene, polyethylene terephthalate, nylon, rayon, and the like.

The fibers which constitute the fiber bundle as described above include, for example, monofibers and bicomponent fibers such as, sheath-core bicomponent fibers and side-by-side bicomponent fibers.

The bicomponent fibers as described above are preferably sheath-core bicomponent fibers, and more preferably sheath-core bicomponent fibers which have a core melting point higher than a sheath melting point, due to its thermal bondability.

The sheath-core bicomponent fibers as described above are more preferably sheath-core bicomponent fibers which have a core of polypropylene or polyethylene terephthalate and a sheath of polyethylene, and still more preferably sheath-core bicomponent fibers which have a core of polyethylene terephthalate and a sheath of polyethylene.

The fibers which constitute the fiber bundle have preferably a fineness of 1 to 50 dtex, and more preferably a fineness of 2 to 10 dtex. The fiber bundle may include a plurality of different fibers which have a same fineness or may include a single type or a plurality of different fibers which have a different fineness.

The fiber bundle as described above may be a bundle of slit fibers, which are formed by slitting and drawing a film, split fibers, which are formed by splitting an elongated film into network segments, or the like.

In an embodiment of the method of producing a cleaning member and the system which produces a cleaning member, according to the present disclosure, the fiber bundle includes or consists of crimped fibers. Because the fiber bundle includes crimped fibers, the fiber bundle can be bulked, and the crimped areas in the brush part formed of the fiber bundle can more easily adsorb dust and dirt.

In another embodiment of the method of producing a cleaning member and the system which produces a cleaning member according to the present disclosure, the fiber bundle does not include crimped fibers.

As described below, the sheet with slits 7 is formed of a nonwoven fabric which consists of or includes thermoplastic fibers (thermally bondable fibers), as with the substrate sheet 12 and the holding sheet 13. And the sheet with slits 7 is formed in a rectangular shape having approximately the same width and length as the substrate sheet 12. The sheet with slits 7 is provided with jagged slits (not illustrated) at predetermined intervals over the entire length of the sheet with slits 7. The slits allow jagged reed-shaped parts (not illustrated) to be formed on both width edges of the cleaning member.

As illustrated in FIG. 10 to FIG. 12, the substrate sheet 12 and the holding sheet 13 are stacked, in this order, on the first fibrous member 3 of the brush part 2, and the receiving part 14 into which the insert part 16 of the handle 15 is inserted is disposed between the substrate sheet 12 and the holding sheet 13.

As illustrated in FIG. 12, the substrate sheet 12 and the holding sheet 13 have the same length in the width direction of the cleaning member, but have a different length in the longitudinal direction of the cleaning member. In other words, the substrate sheet 12 has a longer length in the longitudinal direction of the cleaning member. The holding sheet 13 is stacked on the substrate sheet 12 so that the each longitudinal end of the substrate sheet 12 protrudes outward from the corresponding longitudinal end of the holding sheet 13 by a predetermined distance.

For the cleaning member 1 illustrated in FIG. 10 to FIG. 12, "the longitudinal direction of the cleaning member" (the vertical direction in FIG. 12) means a direction of insertion of the handle 15, while "the width direction of the cleaning member" (the horizontal direction in FIG. 11 and FIG. 12) means a direction orthogonal to the longitudinal direction of the cleaning member.

The substrate sheet 12 and the holding sheet 13 are formed of a nonwoven fabric which consists of or includes thermoplastic fibers (thermally bondable fibers). The thermoplastic fibers include, for example, polyethylene fibers, polypropylene fibers, polyethylene terephthalate fibers, bicomponent fibers of polyethylene and polyethylene terephthalate such as, sheath-core bicomponent fibers which have a core of polyethylene terephthalate and a sheath of polyethylene and bicomponent fibers of polyethylene and polypropylene, and the like. The nonwoven fabric includes a thermal-bonded nonwoven fabric, a spun-bonded nonwoven fabric, a spun-laced nonwoven fabric, and the like.

In another embodiment, the substrate sheet and the holding sheet are formed of a thermoplastic resin film such as, a polyethylene film and a polypropylene film. In still another embodiment, the substrate sheet and the holding sheet are formed of a laminate sheet of a nonwoven fabric and a resin film.

The substrate sheet 12 and the holding sheet 13 are melt bonded to the entire layers of the brush part 2 (the first, second, third, and fourth fibrous members 3, 4, 5, and 6, and the sheet with slits 7) by the first melt bonding apparatus as described below, which is numbered 158 in FIG. 9, and then the first melt bonded part 8 which extends in the longitudinal direction of the cleaning member is formed at the center of the width of the cleaning member, as illustrated in FIG. 10 to FIG. 12.

Additionally, the substrate sheet 12 and the holding sheet 13 are melt bonded to one of the layers of the brush part 2 (the first fibrous member 3), on the opposing sides of the first melt bonded part 8, by the second melt bonding apparatus as described below, which is numbered 134 in FIG. 9, and then two second melt bonded parts 11 are formed in the longitudinal direction. Each of the two second melt bonded parts 11 is formed as a dotted line. Melt bonding of the first fibrous member 3 to the substrate sheet 12 and the holding sheet 13 allows the first fibrous member 3 to be moved with the sheets 12 and 13, thereby facilitating spreading of the brush part 2 in use and thus improving cleaning efficiency.

The substrate sheet 12 and the holding sheet 13 are melt bonded to the entire layers of the brush part 2 (the first, second, third, and fourth fibrous members 3, 4, 5, and 6 and the sheet with slits 7) by the first melt bonded part 8, and the substrate sheet 12 and the holding sheet 13 are also melt bonded to the first fibrous member 3 of the brush part 2 by the two second melt bonded parts 11. This allows a pair of the receiving parts 14 to be formed between the substrate sheets 12 and the holding sheet 13, the receiving parts being defined by the first melt bonded part 8 and one of the two second melt bonded parts 11, extending in the longitudinal direction of the substrate sheet 12 and the holding sheet 13, and being a tube open at opposing longitudinal sides. Thus, the insert part 16 of the handle 15 can be inserted into the receiving parts 14.

The substrate sheet 12 and the holding sheet 13 are melt bonded to the first fibrous member 3 of the brush part 2 along the longitudinal centerline of the cleaning member by the second melt bonding apparatus as described below, which is numbered 134 in FIG. 9, and thus a pair of melt bonded lines 18 are formed at a predetermined width distance from each other. Between the pair of the melt bonded lines 18, the first melt bonded part 8 is formed. The pair of the melt bonded lines 18 are marks which are used to control the position of the first melt bonded part 8 during manufacturing. Good and flawed products are distinguished by determining, using a sensor or the like, whether the first melt bonded part 8 is located between the melt bonded lines 18.

Each of the two second melt bonded parts 11 is disposed as a dotted line in the longitudinal direction. A circular arc projection 16a of the respective insert part 16 of the handle 15 is locked into a non-bonded area in the second melt bonded parts 11 to prevent removal of the respective insert part 16 of the handle 15 from the respective receiving part 14.

As illustrated in FIG. 10, the substrate sheet 12 and the holding sheet 13 are provided with jagged slits 20a. The slits 20a are disposed at predetermined intervals on the opposing width edges of the cleaning member (outwardly of the two second melt bonded parts 11) and in the longitudinal direction of the cleaning member. A plurality of reed-shaped parts 20 with jagged edges are defined in the substrate sheet 12 and the holding sheet 13 by the slits 20a.

In another embodiment, the substrate sheet 12 and the holding sheet 13 include no jagged slits 20a, and thus the cleaning member includes no reed-shaped parts 20.

The handle 15 is formed of plastic or the like, and, as illustrated in FIG. 10, includes a pair of rectangular insert parts 16 disposed parallel to each other; a pair of circular arc projections 16a protruding from the lateral surface of the opposing longitudinal edge portions of the respective insert parts 16, and a holder 17 integrally disposed at one end of the insert parts 16.

The respective insert parts 16 of the handle 15 are inserted into the respective receiving parts 14 of the cleaning member 1, and projections 16a are locked into a non-bonded area in the second melt bonded parts 11 to attach the cleaning member 1 to the handle 15.

A user holds the holder 17 of the handle 15, contacts the brush part 2 with a surface to be cleaned, and moves the cleaning member in a desired direction so that the brush part 2 adsorbs the dust, dirt, and the like on the surface, for cleaning the surface.

The cleaning member illustrated in FIG. 10 to FIG. 12 is an example of the cleaning members which are produced using the method of producing a cleaning member and the system which produces a cleaning member according to the present disclosure. The method of producing a cleaning member and the system which produces a cleaning member according to the present disclosure can be used to produce a cleaning member as described in, for example, Japanese Unexamined Patent Publication No. 2000-296083, 2003-265390, 2003-268663, 2004-223692, 2005-046645, 2005-095665, 2005-111284, 2005-137929, 2005-137930, 2005-137931, 2005-144198, 2005-169148, 2005-199077, 2005-230573, 2005-237975, 2006-015164, 2006-034990, 2006-141483, 2007-135774, 2007-209460, 2007-209461, 2007-029136, 2007-111297, 2007-135666, 2007-136156, 2007-159612, 2007-236690, 2008-006260, 2008-119171, and 2007-029135, the entire disclosure of which is incorporated herein by reference.

In addition, the method of producing a cleaning member and the system which produces a cleaning member according to the present disclosure can be used to produce a cleaning member as described in, for example, U.S. Pat. No. 6,554, 937B, US2002/148061A, US2003/0000934A, US2004/0149095A, US2005/0005381A, US2005/039285A, US2005/097695A, US2005/097696A, US2005/132521A, US2005/177967A, US2005/188490A, US2005/193513A, US2005/193514A, US2005/198760A, US2006/016035A, US2006/016036A, US2006/101601A, US2009/165230A and US2009/172904A, as well as US2009/049633A, US2009/255078A and US2010/154156A, the entire disclosure of which is incorporated herein by reference.

[Step (A)]

The description of the step (A) is omitted. For the details, see "Method of Producing Opened Fiber Bundle and Apparatus which opens Fiber Bundle" described above.

[Step (B)]

In the step (B), the opened fiber bundle is stacked with one or more other materials to form a multilayer web, and the respective materials of the multilayer web are fixed to each other. The one or more other materials which constitute the multilayer web include one or more opened fiber bundles, nonwoven fabrics, and the like. The method for fixing as described above includes use of adhesive such as, hot-melt adhesive, melt bonding such as, heat sealing and ultrasonic sealing, and the like.

Although the method of producing a cleaning member and the system which produces a cleaning member according to the present disclosure is not intended to include a multilayer web of a particular structure, one of the embodiments will be described with reference to FIG. 9.

In FIG. 9, the first belt-shaped fiber bundle F'1 runs through the third nip rolls 114 and then goes to a merging point 132.

On the other hand, a belt-shaped nonwoven fabric 121, which is to form the substrate sheet 12, is continuously wound off from a nonwoven fabric roll 120. The belt-shaped nonwoven fabric 121 is intermittently conveyed by running the belt-shaped nonwoven fabric 121 through a dancer roller 124, which includes a plurality of rolls arranged in upper and lower rows, the rolls in the lower row oscillating up and down. As used herein, "intermittently conveying" refers to repeating a cycle of conveying materials a certain distance (for example, a length corresponding to the width length of the cleaning member) and then halting conveying for a certain period. Intermittent conveying of materials allows time to be gained for melt bonding the components of the multilayer web as described below.

Similarly, a belt-shaped nonwoven fabric 123, which is to form the holding sheet 13, is continuously wound off from a nonwoven fabric roll 122. The belt-shaped nonwoven fabric 123 is intermittently conveyed by running the belt-shaped nonwoven fabric 123 through a dancer roller 126, which includes a plurality of rolls arranged in upper and lower rows, the rolls in the lower row oscillating up and down.

The belt-shaped nonwoven fabric 123 is stacked onto the belt-shaped nonwoven fabric 121 at merging point 128 to form a multilayer web S1 of the belt-shaped nonwoven fabric 121 and the belt-shaped nonwoven fabric 123. The multilayer web S1 runs through a gather cutter 130, which includes serrated blades (not illustrated) formed at spaced apart locations on its circumferential surface, to make slits into the multilayer web S1. The slits in the multilayer web S1 correspond to the slits 20a in the substrate sheet 12 and the holding sheet 13 illustrated in FIG. 10.

Then the first belt-shaped fiber bundle F'1 is stacked onto the multilayer sheet S1 at the merging point 132 to form a multilayer web S2 of the first belt-shaped fiber bundle F'1 and the multilayer sheet S1.

The zone between the third nip rolls 114 and the merging point 132 is configured to convey the first belt-shaped fiber bundle F'1 with the first belt-shaped fiber bundle F'1 flexed to some extent. The flexing brings the similar result of disposing a dancer roller between the third nip rolls 114 and the merging point 132.

The substrate sheet 12, the holding sheet 13, and the first fiber bundle F1, which constitute the multilayer web S2, are melt bonded by a second melt bonding apparatus 134 to form the two second melt bonded parts 11 (see FIG. 11). For the method of producing a cleaning member and the system which produces a cleaning member according to the present disclosure, the second melt bonding apparatus includes, for example, a heat-sealing apparatus, an ultrasonic sealing apparatus, and the like.

Next, in the same manner for the first fiber bundle F1, an opened second fiber bundle F2 (a second belt-shaped fiber bundle F'2) is stacked onto the multilayer web S2 at a merging point 136, and a third fiber bundle F3 (a third belt-shaped fiber bundle F'3) is stacked onto the resulting web at a merging point 138. Then a fourth fiber bundle F4 (a fourth belt-shaped fiber bundle F'4) is stacked onto the resulting web at a merging point 140 to form a multilayer web S3.

Next, a belt-shaped nonwoven fabric 151, which is to form the sheet with slits 7, is continuously wound off from a nonwoven fabric roll 150. The belt-shaped nonwoven fabric 151 is intermittently conveyed by running the belt-shaped nonwoven fabric 151 through a dancer roller 152, and then runs through a gather roll 154. The gather roll 154 includes serrated blades (not illustrated) continuously formed on its circumferential surface, thereby making jagged slits (not illustrated) into the belt-shaped nonwoven fabric 151 running through the gather roll 154.

The sheet with slits 7 formed of the belt-shaped nonwoven fabric 151 is stacked onto the multilayer web S3 at a merging point 156 to form a multilayer web S4 of the sheet with slits 7 and the multilayer web S3.

Then the multilayer web S4 is melt bonded in the thickness direction using a first melt bonding apparatus 158 to form the first melt bonded part 8 (see FIG. 12 and the like) in the multilayer web S4. For the method of producing a cleaning member and the system which produces a cleaning member according to the present disclosure, the first melt bonding apparatus includes, for example, a heat-bonding apparatus, an ultrasonic sealing apparatus, and the like.

[Step (C)]

As the method of producing a cleaning member and the system which produces a cleaning member according to the present disclosure is not intended to include a multilayer web of a particular structure, the step (C) is not particularly limited, so long as the step can cut the fixed multilayer web into individual cleaning members.

In FIG. 9, after the multilayer web S4 runs through the first melt bonding apparatus 158, the web S4 is cut by a cutter unit 160 to produce the cleaning member 1.

Although the system which produces a cleaning member 100 illustrated in FIG. 9 includes the gather roll 154, another embodiment of the method of producing a cleaning member and/or the system which produces a cleaning member according to the present disclosure does not include the gather roll, and the resulting cleaning members include a nonwoven fabric sheet, instead of the sheet with slits.

Still another embodiment of the method of producing a cleaning member and the system which produces a cleaning member according to the present disclosure does not include the gather roll and the step performed upstream from the roll, and the resulting cleaning members include a fibrous member formed as a cleaning surface.

Although the system which produces a cleaning member 100 illustrated in FIG. 9 forms a receiving part below the surface of the cleaning member, in another embodiment of the method of producing a cleaning member and the system which produces a cleaning member according to the present disclosure, the order of stacking the substrate sheet, the holding sheet and the fibrous member is changed to dispose a receiving part between any adjacent fibrous members. This allows the both surfaces of the cleaning member to be used for cleaning.

In another embodiment of the method of producing a cleaning member and the system which produces a cleaning member according to the present disclosure, in order to facilitate insertion of the insert part into the receiving part, the substrate sheet and the holding sheet are preferably configured to have a larger longitudinal dimension compared with the fibrous members. In still another embodiment of the method of producing a cleaning member and the system which produces a cleaning member according to the present disclosure, the sheet with slits is not stacked. In still another embodiment, the sheet with slits 7 is stacked onto the both surfaces of the cleaning member 1.

The present disclosure relates to the following J1 to J14:

[J1]

A method of continuously producing an opened fiber bundle for a cleaning member while conveying a fiber bundle, comprising the steps of:

($a_1$) applying a tensile force to the fiber bundle;

($a_2$) relaxing the tensioned fiber bundle to open the fiber bundle, thereby forming a belt-shaped fiber bundle; and ($a_3$) blowing air in a direction intersecting with the machine direction of the belt-shaped fiber bundle through an air outlet of an air feeder, the unit extending in the width direction, to further open the belt-shaped fiber bundle and widen the belt-shaped fiber bundle in the width direction;

wherein an outer portion in the width direction of the air outlet is disposed downstream in the machine direction, compared with an inner portion in the width direction of the air outlet.

[J2]

The method according to J1, wherein the portions of the air outlet are disposed intermittently or continuously, and the air outlet is curve-shaped or inverted V-shaped.

[J3]

A method of continuously producing an opened fiber bundle for a cleaning member while conveying a fiber bundle, comprising the steps of:

($a_1$) applying a tensile force to the fiber bundle;

($a_2$) relaxing the tensioned fiber bundle to open the fiber bundle, thereby forming a belt-shaped fiber bundle; and ($a_3$) blowing air in a direction intersecting with the machine direction of the belt-shaped fiber bundle through an air outlet of an air feeder, the unit extending in the width direction, to further open the belt-shaped fiber bundle and widen the belt-shaped fiber bundle in the width direction;

wherein an outer portion in the width direction of the air outlet blows air in a direction inclined toward an edge of the width compared with an inner portion in the width direction of the air outlet.

[J4]

The method according to J3, wherein the direction of blowing air is defined by an air nozzle or a baffle.

[J5]

The method according to any one of J1 to J4, wherein the air outlet blows air in a direction inclined upstream in the machine direction.

[J6]

The method according to any one of J1 to J5, wherein air is blown upwardly onto the belt-shaped fiber bundle through the air outlet disposed under the belt-shaped fiber bundle.

[J7]

The method according to J6, wherein a float control plate is disposed above the air outlet so that the belt-shaped fiber bundle is sandwiched between the plate and the unit to prevent the belt-shaped fiber bundle from floating.

[J8]

A method of producing a cleaning member, comprising the steps of:

(A) continuously producing an opened fiber bundle using the method according to any one of J1 to J7;

(B) stacking the opened fiber bundle with one or more other materials to form a multilayer web and fixing the respective materials of the multilayer web to each other; and (C) cutting the fixed multilayer web into individual cleaning members.

[J9]

An apparatus which opens a fiber bundle for a cleaning member, comprising:

first nip rolls;

second nip rolls, which are disposed downstream from the first nip rolls, have a faster peripheral velocity compared with the first nip rolls, and, together with the first nip rolls, convey the fiber bundle to apply a tensile force to the fiber bundle;

third nip rolls, which are disposed downstream from the second nip rolls, have a slower peripheral velocity compared with the second nip rolls, and, together with the second nip rolls, convey the fiber bundle to relax the fiber bundle, thereby forming a belt-shaped fiber bundle; and an air feeder which is disposed downstream from the second nip rolls and comprises an air outlet extending in the width direction and blowing air in a direction intersecting with the machine direction of the belt-shaped fiber bundle;

wherein an outer portion in the width direction of the air outlet is disposed downstream in the machine direction, compared with an inner portion in the width direction of the air outlet, or an outer portion in the width direction of the air outlet blows air in a direction inclined toward an edge of the width compared with an inner portion in the width direction of the air outlet.

[J10]

The apparatus according to J9, wherein the portions of the air outlet are disposed intermittently or continuously, and the air outlet is curve-shaped or inverted V-shaped, or the direction of blowing air is defined by a nozzle or baffle.

[J11]

The apparatus according to J9 or J10, wherein the air outlet blows air in a direction inclined upstream in the machine direction.

[J12]

The apparatus according to any one of J9 to J11, wherein the air outlet is disposed under the belt-shaped fiber bundle and blows air upwardly onto the belt-shaped fiber bundle.

[J13]

The apparatus according to any one of J9 to J12, wherein a reflecting plate is disposed so that the belt-shaped fiber bundle is sandwiched between the plate and the air outlet to reflect the blown air onto the belt-shaped fiber bundle.

[J14]

A system which produces a cleaning member, comprising:

the apparatus which opens a fiber bundle according to any one of J9 to J13;

one or more apparatuses which stack the opened fiber bundle with one or more other materials to form a multilayer web and fix the respective materials of the multilayer web to each other; and one or more apparatuses which cut the fixed multilayer web into individual cleaning members.

The present application claims the benefit of the following patent applications, and the entire disclosure of which is incorporated herein by reference:

(i) JP Patent Application No. 2012-289181 filed on Dec. 29, 2012, and US patent application claiming priority thereof, (ii) JP Patent Application No. 2012-289182 filed on Dec. 29, 2012, and US patent application claiming priority thereof, (iii) JP Patent Application No. 2012-289174 filed on Dec. 29, 2012, (iv) JP Patent Application No. 2012-289189 filed on Dec. 29, 2012, and US patent application claiming priority thereof, (v) JP Patent Application No. 2012-289175 filed on Dec. 29, 2012, and US patent application claiming priority thereof, (vi) JP Patent Application No. 2012-289188 filed on Dec. 29, 2012, and US patent application claiming priority thereof, (vii) JP Patent Application No. 2012-289179 filed on Dec. 29, 2012, and US patent application claiming priority thereof, (viii) JP Patent Application No. 2012-289177 filed on Dec. 29, 2012, and US patent application claiming priority thereof, (ix) JP Patent Application No. 2012-289184 filed on Dec. 29, 2012, and US patent application claiming priority thereof, (x) JP Patent Application No. 2012-289178 filed on Dec. 29, 2012, and US patent application claiming priority thereof, (xi) JP Patent Application No. 2012-289176 filed on Dec. 29, 2012, and US patent application claiming priority thereof, (xii) JP Patent Application No. 2013-002855 filed on Jan. 10, 2013, and US patent application claiming priority thereof, as well as (xiii) JP Patent Application No. 2013-002857 filed on Jan. 10, 2013, and US patent application claiming priority thereof.

REFERENCE SIGNS LIST 1 cleaning member
2 brush part
3 first fibrous member
4 second fibrous member
5 third fibrous member
6 fourth fibrous member
7 sheet with slits
8 first melt bonded part
11 second melt bonded part
12 substrate sheet
13 holding sheet
14 receiving part
15 handle
16 insert part
16a projection 17 holder
18 melt bonded line
20 reed-shaped part
20a slit
100 system which produces cleaning member
101 apparatus which opens fiber bundle
102 first nip rolls
104 tension roll
106 second nip rolls
108 air feeder
109 air outlet
110 oil applicator
112 dust adsorbent oil bath
114 third nip rolls
120, 122, and 150 nonwoven fabric roll
121, 123, and 151 nonwoven fabric
124, 126, and 152 dancer roller
128, 132, 136, 138, 140, and 156 merging point
130 gather cutter
134 second melt bonding apparatus
154 gather roll
158 first melt bonding apparatus
160 cutter unit
201 float control plate
202 air nozzle
203 baffle

The invention claimed is:

1. A method of continuously producing an opened fiber bundle for a cleaning member from a fiber bundle while conveying the fiber bundle in a machine direction, said method comprising the steps of:
    applying a tensile force to the fiber bundle;
    relaxing the tensioned fiber bundle to open the fiber bundle, thereby forming a belt-shaped fiber bundle; and
    blowing air in a direction intersecting with the machine direction of the belt-shaped fiber bundle through an air outlet of an air feeder, the air outlet extending in a width direction transverse to the machine direction, to further open the belt-shaped fiber bundle and widen the belt-shaped fiber bundle in the width direction,
    wherein
    the air outlet has, in the width direction, an outer portion and an inner portion,
    the outer portion is disposed downstream in the machine direction compared with the inner portion, and
    the air outlet blows air in a direction inclined upstream in the machine direction and at an acute angle relative to a plane of the belt-shaped fiber bundle.

2. The method according to claim 1, wherein the portions of the air outlet are disposed intermittently or continuously, and the air outlet is curve-shaped or inverted V-shaped.

3. The method according to claim 1, wherein air is blown upwardly onto the belt-shaped fiber bundle through the air outlet disposed under the belt-shaped fiber bundle.

4. The method according to claim 3, wherein a float control plate is disposed above the air outlet so that the belt-shaped fiber bundle is sandwiched between the plate and the air outlet to prevent the belt-shaped fiber bundle from floating.

5. A method of producing a cleaning member, said method comprising the steps of:
    continuously producing an opened fiber bundle;
    stacking the opened fiber bundle with one or more other materials to form a multilayer web and fixing the respective materials of the multilayer web to each other; and
    cutting the fixed multilayer web into individual cleaning members,
    wherein said step of continuously producing the opened fiber bundle includes
    applying a tensile force to the fiber bundle;
    relaxing the tensioned fiber bundle to open the fiber bundle, thereby forming a belt-shaped fiber bundle; and
    blowing air in a direction intersecting with the machine direction of the belt-shaped fiber bundle through an air outlet of an air feeder, the air outlet extending in a width direction transverse to the machine direction, to further open the belt-shaped fiber bundle and widen the belt-shaped fiber bundle in the width direction,
    wherein
    the air outlet has, in the width direction, an outer portion and an inner portion,
    the outer portion is disposed downstream in the machine direction compared with the inner portion, and
    the air outlet blows air in a direction inclined upstream in the machine direction and at an acute angle relative to a plane of the belt-shaped fiber bundle.

6. The method according to claim 1, wherein the step of blowing air is conducted after the steps of applying the tensile force and relaxing the tensioned fiber bundle.

7. The method according to claim 1, wherein
    the step of applying the tensile force is conducted by first and second nip rolls,
    the step of blowing air is conducted by the air outlet of the air feeder, and
    the air outlet of the air feeder is disposed downstream of the first and second nip rolls in the machine direction.

8. The method according to claim 1, wherein
    the air outlet has an inverted V-shape having two ends and a tip between the two ends, and
    the tip of the inverted V-shape is positioned upstream of the two ends of the inverted V-shape in the machine direction.

9. The method according to claim 8, wherein the air feeder comprises a plurality of air nozzles adjacent to each other and defining the air outlet along the inverted V-shape.

10. The method according to claim 5, wherein the step of blowing air is conducted after the steps of applying the tensile force and relaxing the tensioned fiber bundle.

11. The method according to claim 5, wherein
    the step of applying the tensile force is conducted by first and second nip rolls,
    the step of blowing air is conducted by the air outlet of the air feeder, and
    the air outlet of the air feeder is disposed downstream of the first and second nip rolls in the machine direction.

12. The method according to claim 5, wherein
    the air outlet has an inverted V-shape having two ends and a tip between the two ends, and
    the tip of the inverted V-shape is positioned upstream of the two ends of the inverted V-shape in the machine direction.

13. The method according to claim 12, wherein the air feeder comprises a plurality of air nozzles adjacent to each other and defining the air outlet along the inverted V-shape.

* * * * *